(12) United States Patent  (10) Patent No.: US 8,246,066 B1
Allen et al.  (45) Date of Patent: Aug. 21, 2012

(54) METHOD AND APPARATUS FOR COVERING A WATERCRAFT

(76) Inventors: Adam Allen, Anniston, AL (US); Chris Allen, Shreveport, LA (US)

( * ) Notice: Subject to any disclaimer, the term of this patent is extended or adjusted under 35 U.S.C. 154(b) by 173 days.

(21) Appl. No.: 12/804,184

(22) Filed: Jul. 16, 2010

(51) Int. Cl.
B62D 63/08 (2006.01)
B62J 11/00 (2006.01)

(52) U.S. Cl. .................................. 280/414.1

(58) Field of Classification Search ............ 296/100.11, 296/136.11, 136.12
See application file for complete search history.

(56) References Cited

U.S. PATENT DOCUMENTS

| | | | |
|---|---|---|---|
| 2,723,156 A | 11/1955 | Stanziale | |
| 4,075,723 A | 2/1978 | Bareis et al. | |
| 4,641,600 A | 2/1987 | Halvorson | |
| 5,479,872 A | 1/1996 | Hulett | |
| 5,481,999 A | 1/1996 | Clark | |
| 6,250,709 B1 | 6/2001 | Haddad, Jr. | |
| 8,123,274 B1 * | 2/2012 | Edwards et al. | 296/100.11 |
| 2006/0232095 A1 | 10/2006 | Sedighzadeh | |
| 2007/0102951 A1 * | 5/2007 | Chenowth | 296/98 |
| 2008/0136211 A1 * | 6/2008 | Gomes et al. | 296/98 |
| 2009/0267381 A1 * | 10/2009 | Huddleston et al. | 296/100.08 |

* cited by examiner

*Primary Examiner* — Tony Winner
(74) *Attorney, Agent, or Firm* — George L Williamson

(57) ABSTRACT

Apparatus and method for an automatic mechanically-operated tarp/cover system specifically built for boats but which can be used with other types of vehicles. The present invention is intended for use with conventional boat trailers having a tongue and a pair of rear wheels which is designed to be attached to and pulled on the rear end of a towing vehicle. The present invention comprises a U-shaped hoop which is connected approximately intermediate the length of the trailer having one end of the a cover/tarp connected on the distal end of the hoop and the other end of the cover/tarp rolled up on and stored on a tarp bar mounted by a frame to the front portion of the trailer wherein the tarp/cover is carried on the tarp bar, which bar is turned by an electrical motor adapted for connection to the tarp bar. In operation, the tarp is stored on the tarp roller bar and when it is desired to cover the boat the hoop is pulled over the boat/vehicle from the front toward the rear of the boat/vehicle in order to cover the boat.

19 Claims, 2 Drawing Sheets

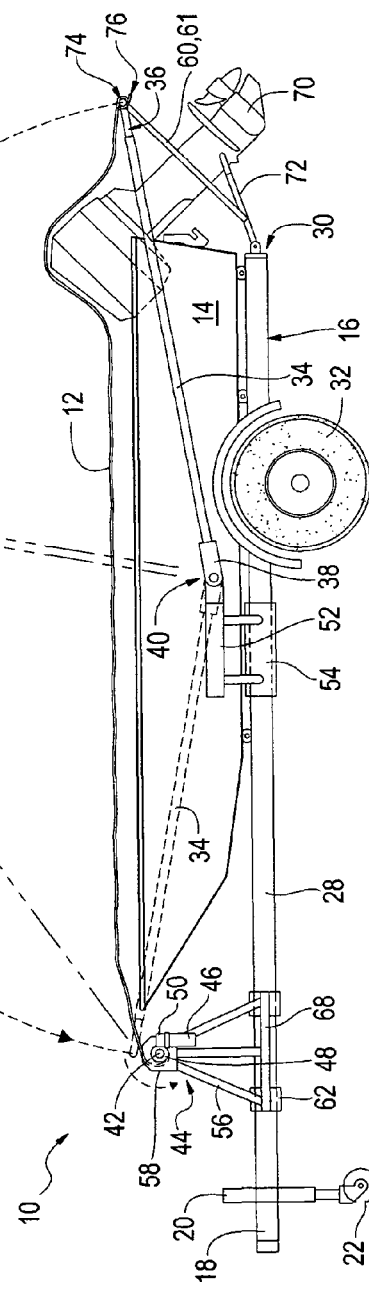
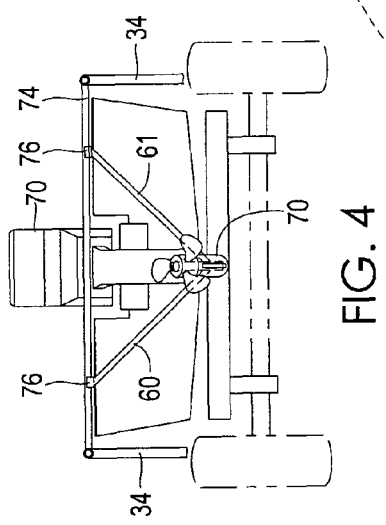
FIG. 4
FIG. 1

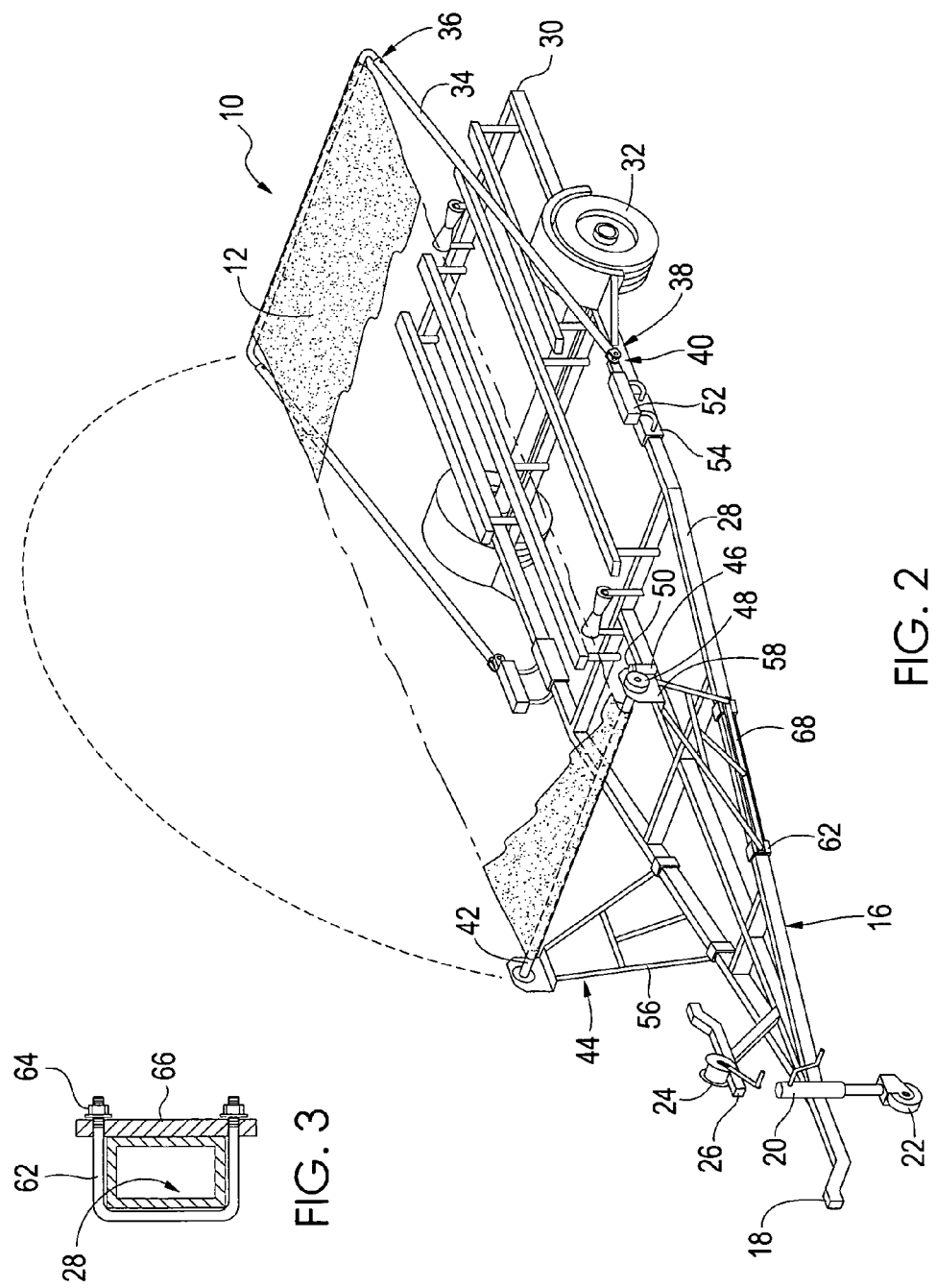

METHOD AND APPARATUS FOR COVERING A WATERCRAFT

BACKGROUND OF THE INVENTION

1. Field of the Invention

The present invention relates generally to watercraft, and, more particularly, is concerned with a cover for a watercraft.

2. Description of the Prior Art

Boat/vehicle covers have been described in the prior art, however, none of the prior art devices disclose the unique features of the present invention.

In U.S. Pat. No. 5,481,999 dated Jan. 9, 1996, Clark disclosed a trailer-mounted boat cover. In U.S. Pat. No. 2,723,156 dated Nov. 8, 1955, Stanziale disclosed a cover for motor vehicles. In U.S. Patent Application Publication No. U.S. 2006/0232095 dated Oct. 19, 2006, Sedighzadeh disclosed a retractable rollup cover. In U.S. Pat. No. 6,250,709 dated Jun. 26, 2001, Haddad, Jr., disclosed a vehicle mounted covering system. In U.S. Pat. No. 5,479,872 dated Jan. 2, 1996, Hulett disclosed a support for a boat cover. In U.S. Pat. No. 4,641,600 dated Feb. 10, 1987, Halvorson disclosed a rolling boat cover. In U.S. Pat. No. 4,075,723 dated Feb. 28, 1978, Bareis, et al., disclosed a boat cover means. While these boat/vehicle covers may be suitable for the purposes for which they were designed, they would not be as suitable for the purposes of the present invention as hereinafter described.

SUMMARY OF THE PRESENT INVENTION

The present invention discloses an automatic mechanically-operated tarp/cover system specifically built for boats but which can be used with other types of vehicles. The present invention is intended for use with conventional boat trailers having a tongue and a pair of rear wheels which is designed to be attached to and pulled on the rear end of a towing vehicle. The present invention comprises a U-shaped hoop having a proximate end which is connected approximately intermediate the length of the trailer having one end of the a cover/tarp connected on the distal end of the hoop and the other end of the cover/tarp rolled up on and stored on a tarp bar mounted by a frame to the front portion of the trailer wherein the tarp/cover is carried on the tarp bar, which bar is turned by an electrical motor adapted for connection to the tarp bar. In operation, the tarp is stored on the tarp roller bar and when it is desired to cover the boat the hoop is moved over the boat/vehicle from the front toward the rear of the boat/vehicle in order to cover the boat.

An object of the present invention is to provide an easily operable automatic covering system for a boat/vehicle. A further object of the present invention is to provide a system which can be attached to existing trailers. A further object of the present invention is to provide a boat cover which can be installed without special tools. A further object of the present invention is to provide a boat cover system which can be relatively inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 1 is a perspective view of the present invention.

FIG. 2 is a side view of the present invention in operative connection.

FIG. 3 is a cross section view of portions of the present invention.

FIG. 4 is a rear view of portions of the present invention.

LIST OF REFERENCE NUMERALS

With regard to reference numerals used, the following numbering is used throughout the drawings.

10 present invention
12 tarp/cover
14 boat/vehicle
16 trailer
18 tongue
20 jack stand
22 wheel
24 winch
26 mount
28 frame of trailer
30 rear end
32 wheels
34 hoop
36 adjustment for hoop
38 coupler
40 springs
42 tarp bar
44 frame
46 motor
48 gear rack
50 pinion
52 mounting bracket
54 U-bolts
56 tubing
58 motor support
60 rear bar support
61 rear bar support
62 U-bolt
64 nut
66 member
68 mounting bracket
70 outboard motor
72 outboard motor support
74 cross member
76 cradle

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 4 illustrate the present invention wherein a method and apparatus for automatically covering a boat/vehicle/watercraft is disclosed.

Turning to FIGS. 1-4, therein is disclosed the present invention 10 showing a tarp/cover 12 to be used to cover the boat/vehicle 14 which is mounted onto a conventional boat trailer 16 having a frame having first and second end portions and side portions. The trailer 16 has a tongue 18, jack stand 20 with a wheel 22 thereon along with a winch 24 and having a mount 26 for mounting the winch to the front portion of the frame 28 of the trailer 16 wherein the trailer also has a rear end 30 having a pair of wheels 32 for contacting the support surface such as a road wherein the trailer is conventionally towed behind a towing vehicle. Also shown is a U-shaped hoop 34 which is length adjustable at 36 using telescopic members near the distal end portions where the tarp 12 is attached to the hoop. The hoop 34 is constructed of tubular aluminum or like material and the proximate end portions are attached to the sides of the boat trailer 16 at about the middle point of the trailer by means of spring loaded couplers 38 which springs 40 are constantly biased toward the rear of the boat trailer. Means for rotating the tarp bar 42 is provided by electrical means or manual means. When the electric motor 46 is reversed the springs 40 pull the hoop 34 with attached cover 12 toward the rear 30 of the boat 14. Also shown is the tarp bar 42 whereupon the tarp 12 is attached to and rolled upon the tarp bar when in the stored position; the tarp bar is a round piece of aluminum or like material that is suspended proximate the front of the boat 14 and then attached to the trailer 16 by means of frame 44 and the ends of the tarp bar are rotatable in the frame. The tarp bar 42 is disposed in a substantially horizontal plane and is substantially perpendicular to a central axis of the trailer 16. Also shown is a conventional 12 volt electric motor 46 with gear rack 48 and pinion 50 being adapted for connection to the tarp bar 42 so as to turn the tarp bar when the motor is actuated. When the electric motor 46 is actuated it either rolls the tarp bar 46 and the tarp connected thereto in a forward or reverse direction, i.e., clockwise or counterclockwise depending on the direction in which the tarp 12 is rolled onto the tarp bar. If the electric motor 46 is engaged in the forward direction the tarp bar will begin to roll and thus will roll the boat tarp 12 onto the tarp bar. When the electric motor 46 is engaged in the reverse direction the springs 40 in the hoop 34 will begin to unwind the tarp 12 so as to position, i.e., roll out, the tarp over the top of the boat 14 thereby extending the tarp from the front to the rear of the boat so as to cover the boat. Also shown are the steel or like material mounting brackets 52 which attach the coupler 38 for the hoop 34 to the boat trailer which brackets attach to the outside of the trailer frame by using square U-bolts 54. These mounting brackets 52 make the system easy to attach to or remove from the boat trailer 16 thereby eliminating any need to modify an existing boat trailer. The tarp bar 42 and electric motor 46 are located proximate the front of the boat trailer 16 and they are secured to the trailer by aluminum or like material square tubing 56 which is part of frame 44. This tubing 56 allows the tarp bar 42 to be suspended over or near to the nose of the boat 14. These frame and bars 44, 56 also prevent the tarp bar 42 assembly from moving due to the torque produced by the electric motor 46 and the springs 40 in the hoop coupler 38. These support frames 44 are attached to the trailer 16 by the use of mounting bracket 68 using U-bolts 62. Also shown are the motor support 58 and rear bar support 60. When the boat 14 is covered and the distal end or cross member 74 of the hoop 34 is all the way to the rear 30 of the trailer 16 the distal end of the hoop requires support 60, 61 as best seen in FIGS. 1 and 4. Supports 60, 61 have two pieces which extend upwardly from about the middle of the conventional outboard motor support 72 for the lower end of the outboard motor 70. The supports 60, 61 extend upward toward the two corners of the cross member 74 of the hoop 34 and have cradles or rests 76 on the upper end for receiving the cross member 74 therein while the trailer 16 with boat 14 is in transit. Supports 60, 61 keep the cross member 74 secure and in substantially the horizontal plane when the tarp 12 is covering the boat 14.

FIG. 3 shows a typical U-bolt 62 installation showing the U-bolt with nut 64 attaching a typical member 66, such as the mounting bracket 52, 68, to the frame 28 of the trailer as would be done in the standard manner by one skilled in the art.

By way of further explanation, the present invention is a mechanically operated tarp system specifically built for boats/watercraft wherein the system will mechanically roll and unroll the tarp used for covering the boat. The system bolts to the trailer and stays in place when the boat is taken on and off the trailer. After the boat is on the trailer the tarp can be unrolled by pushing a button that controls an electric motor. The system will also be offered in a more economical hand crank model. The entire system will bolt onto the boat's trailer. There will be no welding or special tools required. The system will be wired directly to the boat's electrical system using a waterproof quick disconnect. The mechanical system will be able to be purchased separately. This will allow consumers to use their existing boat tarp. The existing boat tarp will need to be sewn to the mechanical system. Material flaps will be provided in order to attach the existing tarp to the mechanical system. The existing tarps will be sewn to the flaps. This system will allow consumers to quickly and easily protect their boats. It will also allow individuals previously not physically able to take their boat tarp off and on by themselves the ability to do so. The system will be wired directly to the electrical system of the boat using a waterproof quick disconnect.

We claim:

1. A trailer for carrying and transporting a watercraft and having a frame with first and second sides, and front and rear ends, comprising:
   a) a U-shaped hoop having first, proximate and second, distal ends and first and second sides, wherein said first and second side of said first end of said hoop is adapted for rotatable connection to the corresponding first and second sides of the frame of the trailer so that when said hoop is rotated said distal end moves from a first position proximate the front end of the trailer to a second position proximate the rear end of the trailer;
   b) a rotatable tarp bar having first and second ends disposed proximate the front end of the trailer, wherein said tarp bar is disposed in a substantially horizontal plane, wherein said tarp bar is substantially perpendicular to a central axis of the trailer, wherein said first and second end of said tarp bar is adapted for connection to a corresponding first and second side of the frame of the trailer;
   c) a tarp having first and second ends and first and second sides, wherein said first end of said tarp is connected to said tarp bar and said second end of said tarp is connected to said distal end of said hoop, wherein in a first position said tarp is rolled onto said tarp bar, wherein in a second position said tarp is unrolled from said tarp bar, wherein said tarp substantially covers the watercraft when said distal end of said hoop is in said second position and said tarp is in said second position, whereby said watercraft is loadable on or offloadable from said trailer when said tarp is in said first position and said watercraft, when on said trailer, is covered by said tarp when said tarp is in said second position; and d) said trailer having a tongue at its forward end, said tongue being pivotally connected to a tow vehicle.

2. The trailer of claim 1, having means biasing said hoop toward the rear end of the trailer to permit the distal end of said hoop to move from said first position to said second position, wherein said hoop is length adjustable.

3. The trailer of claim 2, wherein said biasing means comprises a spring loaded coupler attaching said hoop to said trailer.

4. The trailer of claim 1, wherein said first end of said hoop is connected to the trailer by using a coupler.

5. The trailer of claim 4, wherein said coupler is connected to the trailer with a first U-bolt.

6. The trailer of claim 5, further comprising a frame for connecting said tarp bar to the trailer, wherein said first and second end of said tarp bar is supported by said frame, wherein said first and second end of said tarp bar is rotatable in said frame.

7. The trailer of claim 6, further comprising a second U-bolt for connecting said frame to the trailer.

8. The trailer of claim 7, wherein said first and second U-bolts are adapted to connect to an existing boat trailer.

9. The trailer of claim 1, further comprising means mounted adjacent said tarp bar for rotating said tarp bar clockwise or counterclockwise.

10. A method for covering a watercraft while carrying and transporting said watercraft on a trailer, the trailer having a frame having first and second sides, and front and rear ends, comprising the steps of:

a) providing a U-shaped hoop having first, proximate and second, distal ends and first and second sides, wherein the first and second side of the first end of the hoop is connected to the corresponding first and second side of the frame of the trailer so that when the hoop is rotated the distal end moves from a first position proximate the front end of the trailer to a second position proximate the rear end of the trailer;

b) providing a rotatable tarp bar having first and second ends disposed proximate the front end of the trailer, wherein the tarp bar is disposed in a substantially horizontal plane, wherein the tarp bar is substantially perpendicular to a central axis of the trailer, wherein the first and second end of the tarp bar is connected to a corresponding first and second side of the frame of the trailer; and, c) providing a tarp having first and second ends and first and second sides, wherein the first end of the tarp is connected to the tarp bar and the second end of the tarp is connected to the distal end of the hoop, wherein in a first position the tarp is rolled onto the tarp bar, wherein in a second position the tarp is unrolled from the tarp bar, wherein the tarp substantially covers the boat when the distal end of the hoop is in the second position and the tarp is in the second position, whereby the watercraft is loadable on or offloadable from the trailer when the tarp is in the first position and the watercraft, when on the trailer, is covered by the tarp when the tarp is in the second position; and d) providing the trailer with a tongue on its front end, the tongue being pivotally connected to a tow vehicle.

11. The method of claim 10, wherein the hoop is biased toward the rear end of the trailer so that the distal end of the hoop moves from the first position to the second position, wherein the hoop is length adjustable.

12. The method of claim 10, wherein the hoop is biased toward the rear end of the trailer by a spring.

13. The method of claim 10, wherein the first end of the hoop is connected to the trailer by using a coupler.

14. The method of claim 13, wherein the coupler is connected to the trailer with a first U-bolt.

15. The method of claim 10, providing a frame for connecting the tarp bar to the trailer, wherein the first and second end of the tarp bar is supported by the frame, wherein the first and second end of the tarp bar is rotatable in the frame.

16. The method of claim 15, providing a second U-bolt for connecting the frame to the trailer.

17. The method of claim 10, further comprising the step of rotating the tarp bar, wherein the tarp bar can be rotated clockwise or counterclockwise so that the tarp can be rolled onto the tarp bar and unrolled from the tarp bar.

18. An apparatus for covering a watercraft, the watercraft being carried on a watercraft trailer, the trailer having a frame having first and second sides, and front and rear ends, comprising:

a) a U-shaped hoop having first, proximate and second, distal ends and first and second sides, wherein said first and second side of said first end of said hoop is adapted for rotatable connection to the corresponding first and second side of the frame of the trailer so that when said hoop is rotated said distal end moves from a first position proximate the front end of the trailer to a second position proximate the rear end of the trailer;

b) a rotatable tarp bar having first and second ends disposed proximate the front end of the trailer, wherein said tarp bar is disposed in a substantially horizontal plane, wherein said tarp bar is substantially perpendicular to a central axis of the trailer, wherein said first and second end of said tarp bar is adapted for connection to a corresponding first and second side of the frame of the trailer;

c) a tarp having first and second ends and first and second sides, wherein said first end of said tarp is connected to said tarp bar and said second end of said tarp is connected to said distal end of said hoop, wherein in a first position said tarp is rolled onto said tarp bar, wherein in a second position said tarp is unrolled from said tarp bar, wherein said tarp substantially covers the watercraft when said distal end of said hoop is in said second position and said tarp is in said second position; and d) a rear bar support having first and second ends, wherein said first end connects to the rear end of the trailer and said second end supports said distal end of said hoop when said distal end of said hoop is in said second position.

19. A method for covering a watercraft, the watercraft being carried on a watercraft trailer, the trailer having a frame having first and second sides, and front and rear ends, comprising the steps of:

a) providing a U-shaped hoop having first, proximate and second, distal ends and first and second sides, wherein the first and second side of the first end of the hoop is connected to the corresponding first and second side of the frame of the trailer so that when the hoop is rotated the distal end moves from a first position proximate the front end of the trailer to a second position proximate the rear end of the trailer;

b) providing a rotatable tarp bar having first and second ends disposed proximate the front end of the trailer, wherein the tarp bar is disposed in a substantially horizontal plane, wherein the tarp bar is substantially perpendicular to a central axis of the trailer, wherein the first and second end of the tarp bar is connected to a corresponding first and second side of the frame of the trailer;

c) providing a tarp having first and second ends and first and second sides, wherein the first end of the tarp is connected to the tarp bar and the second end of the tarp is connected to the distal end of the hoop, wherein in a first position the tarp is rolled onto the tarp bar, wherein in a second position the tarp is unrolled from the tarp bar, wherein the tarp substantially covers the watercraft when the distal end of the hoop is in the second position and the tarp is in the second position; and d) providing a rear bar support having first and second ends, wherein the first end connects to the rear end of the trailer and the second end supports the distal end of the hoop when the distal end of the hoop is in the second position.

\* \* \* \* \*